United States Patent
Aimo Boot et al.

(10) Patent No.: US 10,714,719 B2
(45) Date of Patent: Jul. 14, 2020

(54) HOUSING OF VEHICLE LITHIUM BATTERY-MODULES

(71) Applicants: IVECO S.p.A., Turin (IT); NICE POWER S.r.l., Rivalta di Torino (IT)

(72) Inventors: Marco Aimo Boot, Caselle Torinese (IT); Giorgio Mantovani, Genoa (IT); Marino Sergi, Rivalta di Torino (IT)

(73) Assignees: IVECO S.p.A., Turin (IT); NICE POWER S.r.l., Turin (IT)

( * ) Notice: Subject to any disclaimer, the term of this patent is extended or adjusted under 35 U.S.C. 154(b) by 374 days.

(21) Appl. No.: 15/310,497

(22) PCT Filed: May 12, 2015

(86) PCT No.: PCT/IB2015/053497
§ 371 (c)(1),
(2) Date: Nov. 11, 2016

(87) PCT Pub. No.: WO2015/173737
PCT Pub. Date: Nov. 19, 2015

(65) Prior Publication Data
US 2017/0077471 A1    Mar. 16, 2017

(30) Foreign Application Priority Data
May 12, 2014    (IT) .............................. MI2014A0854

(51) Int. Cl.
*H01M 2/12*    (2006.01)
*H01M 10/0525*    (2010.01)
(Continued)

(52) U.S. Cl.
CPC ............. *H01M 2/12* (2013.01); *B60L 3/0046* (2013.01); *B60L 58/26* (2019.02);
(Continued)

(58) Field of Classification Search
CPC combination set(s) only.
See application file for complete search history.

(56) References Cited

U.S. PATENT DOCUMENTS

2005/0170240 A1    8/2005    German et al.
2007/0144804 A1*   6/2007    Pike ................. B60L 11/1874
                                                      180/170
(Continued)

FOREIGN PATENT DOCUMENTS

| EP | 2626923 A1 | 8/2013 | |
| EP | 2738834 | * 6/2014 | .............. H01M 2/10 |
| WO | WO 2013/018283 | * 2/2013 | .............. H01M 2/10 |

OTHER PUBLICATIONS

International Search Report for International Application No. PCT/IB2015/053497 dated Sep. 11, 2015, 2 pages.

*Primary Examiner* — Amanda J Barrow
(74) *Attorney, Agent, or Firm* — RMCK Law Group, PLC

(57) ABSTRACT

A housing of vehicle lithium battery-modules, each battery-module having an evacuation opening and a parallelepipedal shape, where a plurality of horizontal plates are arranged inside the housing, parallel to each other, alternated with layers of the battery-modules, wherein each one of the horizontal plates is joined to perimetral surfaces of the housing to convey heat towards the external environment, wherein each battery-module is arranged so that the evacuation openings are vertically aligned, and wherein each one of the horizontal plates comprises corresponding openings equipped with appropriate gaskets on both the opposite faces of the horizontal plates, in order to define continuous and gastight evacuation channels between the battery-modules.

8 Claims, 5 Drawing Sheets

(51) Int. Cl.
*H01M 10/613* (2014.01)
*H01M 10/6562* (2014.01)
*H01M 10/6556* (2014.01)
*H01M 10/6555* (2014.01)
*H01M 2/10* (2006.01)
*H01M 10/6566* (2014.01)
*B60L 3/00* (2019.01)
*B60L 58/26* (2019.01)
*H01M 10/6551* (2014.01)
*H01M 10/6563* (2014.01)

(52) U.S. Cl.
CPC ....... *H01M 2/1077* (2013.01); *H01M 10/613* (2015.04); *H01M 10/6555* (2015.04); *H01M 10/6556* (2015.04); *H01M 10/6562* (2015.04); *H01M 10/6566* (2015.04); *H01M 10/0525* (2013.01); *H01M 10/6551* (2015.04); *H01M 10/6563* (2015.04); *H01M 2220/20* (2013.01); *Y02E 60/122* (2013.01); *Y02T 10/705* (2013.01); *Y02T 10/7011* (2013.01)

(56) References Cited

U.S. PATENT DOCUMENTS

| | | | |
|---|---|---|---|
| 2008/0268316 A1* | 10/2008 | Park | H01M 8/0247 429/492 |
| 2012/0129024 A1 | 5/2012 | Marchio et al. | |
| 2013/0004822 A1* | 1/2013 | Hashimoto | H01M 2/1072 429/120 |
| 2013/0220716 A1 | 8/2013 | Favaretto | |
| 2013/0266838 A1 | 10/2013 | Borck | |
| 2014/0057144 A1* | 2/2014 | Yang | H01M 10/42 429/62 |
| 2014/0072861 A1* | 3/2014 | Nakayama | H01M 2/202 429/158 |

* cited by examiner

HOUSING OF VEHICLE LITHIUM BATTERY-MODULES

CROSS-REFERENCE TO RELATED APPLICATIONS

This application is a 371 U.S. National Stage of International Application No. PCT/IB2015/053497, filed May 12, 2015, which claims priority to Italian Application No. MI2014A000854 filed on May 12, 2014. The disclosure of each of the above applications is incorporated herein by reference in their entirety.

APPLICATION FIELD OF THE INVENTION

The present invention refers to the field of housings of vehicle lithium battery-modules.

DESCRIPTION OF THE PRIOR ART

The manufacturing of hybrid and electric vehicles comprise the installation of a certain number of lithium battery-modules. Such battery-modules are specially made for the automotive field, for driving electrical or hybrid vehicles.

Each single battery-module has a parallelepipedal shape and is made so that, in case of overheating, a part of the case opens in order to allow the discharge of hot gases, and thus prevent the explosion of the battery-module itself and the propoagation to the adjacent battery-modules.

Such battery-modules of the prior art, as shown in FIG. 6, are equipped with at least one, generally a pair of through openings M1, which pass through the parallelepipedal body of the battery-module perpendicular to two reciprocally parallel sides, defining safety or evacuation openings.

In case of damage of the battery-modules, some internal portions of the case open, in a controlled way, towards said through openings M1.

Furthermore such battery-modules tend to heat during their use, thus they are generally cooled by a liquid circuit or a by forced air. Both the battery-modules and the respective cooling circuit are housed in the vehicle, in appropriate spaces made within the vehicle body, or externally between the side members in case of industrial vehicles.

SUMMARY OF THE INVENTION

The aim of the present invention is to provide a housing for vehicle lithium battery-modules and the like, particularly adapted to accommodate a plurality of monolithic battery-modules.

The idea at the basis of the present invention is to make a single device that is able to extract the heat produced and dispersed by one or more battery-modules and to facilitate, if necessary, the discharge of hot gases released by one or more damaged battery-modules, providing the cooling of such gases, for the safety of the persons and goods that can be in close proximity.

The object of the present invention is a housing of vehicle lithium battery-modules, in accordance with claim 1.

Advantageously, portions of the internal surfaces for gathering and conveying the heat cooperate to define evacuation channels of the hot gases developed by the battery-modules in case of exceeding the higher overheating limit.

Furthermore, such channels are gastight, so that on the one hand, eventual hot gases cannot hit other components inserted in the housing itself, by damaging it; on the other hand, the housing is isolated from the external environment and thus it is not subject to dust accumulations, liquids, etc.

The object of the present invention is also a vehicle comprising said housing of vehicle battery-modules, as described more fully in the claims, which are an integral part of this description.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which.

In the figures the same reference numbers and letters identify the same elements or components.

DETAILED DESCRIPTION OF PREFERRED EMBODIMENTS OF THE INVENTION

With reference to FIGS. 1-5 the housing that is object of the present invention 1 has a parallelepipedal shape with six sides, each side being formed by a surface/plate, of which
the front surface/plate 1F,
the two lateral surfaces/places 1L,
the upper surface/plate 1S,
the lower surface/plate 1I,
the rear surface/plate 1P.

Preferably, the upper and lower plates are made with folded edges, so that they can be easily assembled with the perimetral plates, namely the front/lateral/rear plates.

The latter can be advantageously obtained by punching or milling a single strip of material, subsequently folded.

Figure 3:
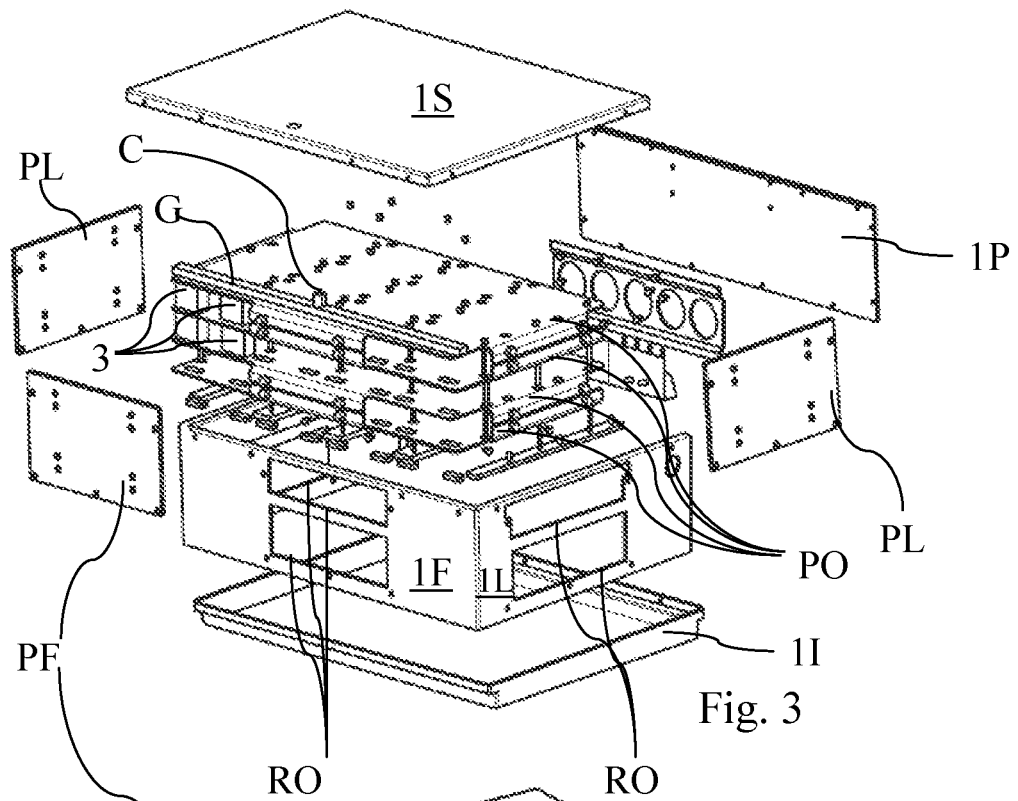
FIGS. 3 and 4 show two exploded views of FIG. 1 according to two different perspective views.
Figure 4:
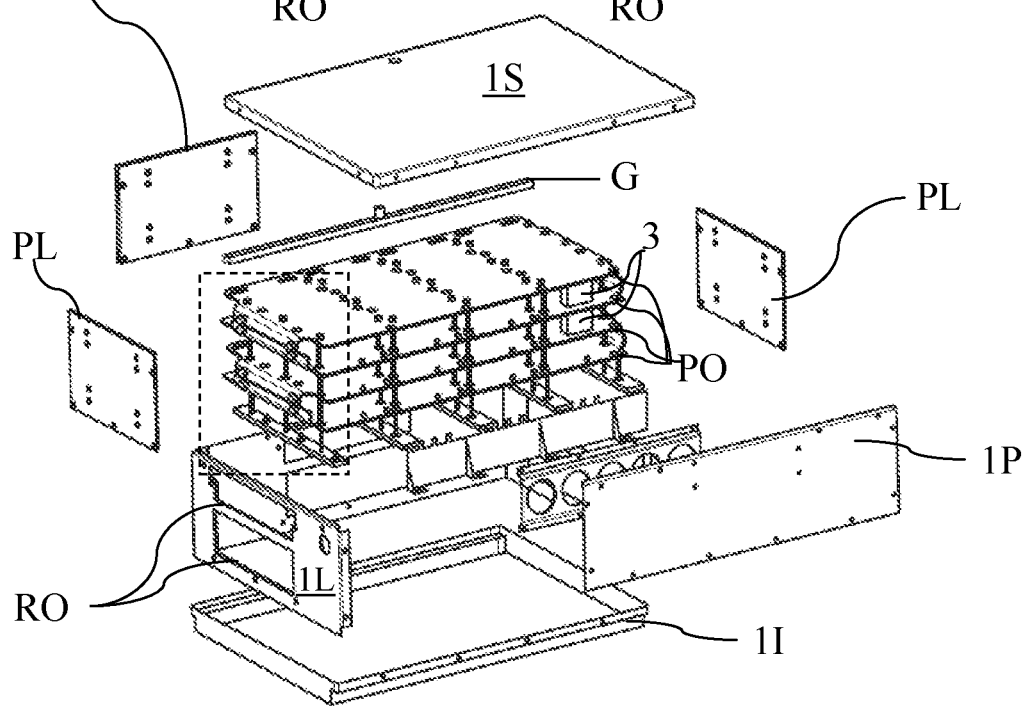
Figure 4A:
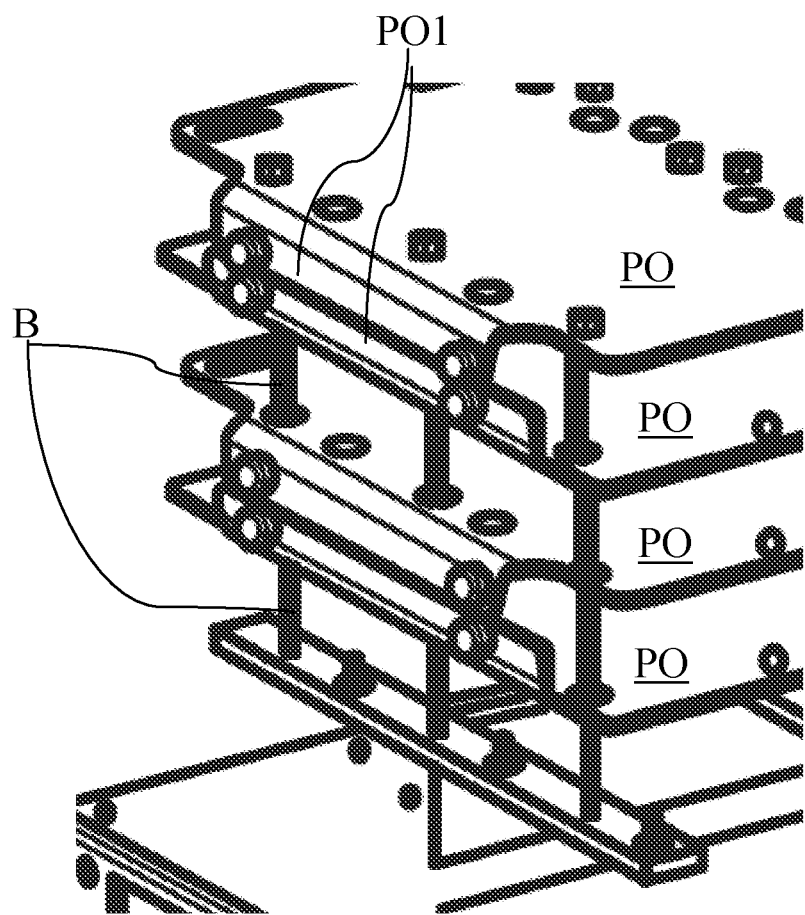
FIG. 4a shows an enlarged detail of FIG. 4.

With reference to FIGS. 3 and 4, it can be clearly seen that the lateral plates and the front plate are made in a single piece.

If the perimetral plates, namely the front/lateral/rear plates, are made of a highly dispersant material, such as aluminium, copper or stainless steel, then the plates themselves contribute to the dispersion of the battery-module heat towards the outside.

Otherwise, within the lateral and front plates, appropriate openings RO are made, preferably having a rectangular shape. Such openings RO are closed by respective thermal dispersion plates: a front thermal dispersion plate PF and two lateral thermal dispersion plates PL.

In this case, such dispersion plates represent the means through which the heat produced by the battery-modules is dissipated in the external environment.

In case it is necessary to increase the dispersing capacity of the dispersion plates PL, they can be made with finned external surfaces or by using, as dispersion plates PL, external surfaces of a liquid heat exchanger. Both such solution are able to increase the efficiency of the passive heat exchange.

With reference to FIGS. 3 and 4, it is possible to see that, horizontal plates PO are arranged inside the housing 1, namely parallel to the upper plate 1S and the lower plate 1I. Such plates are intended to gather the heat dissipated by the battery-modules M inside the housing 1, to convey it towards the perimetral thermal dispersion plates.

The horizontal plates PO are parallel and are constrained to each other, by means of stud bolts B, which press the horizontal plates to the upper face of the battery-modules M (not shown). Thus, the horizontal plates PO are intended to come into direct contact with the surface of the battery-modules shown in FIG. 6.

The horizontal plates have edges PO1 folded by 90°, at least in the proximity of the aforementioned openings RO of the front and lateral plates, so that they can be directly connected to the front and lateral thermal dispersion plates, ensuring a thermal continuity.

Figure 6:
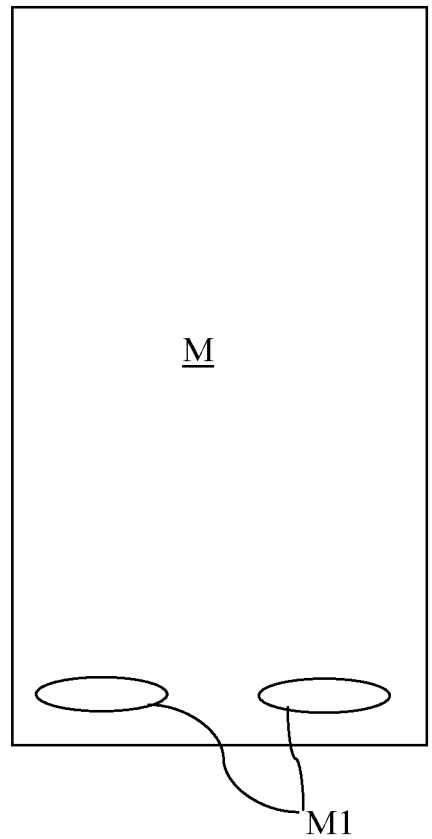
FIG. 6 shows a top view of a battery-module per se known, the device that is object of the present invention being intended to be used with a plurality of them.

The battery-modules M shown in FIG. 6 have a parallelepipedal shape with a pair of evacuation openings M1 to allow the evacuation of hot gases given off in case of a breaking of the battery-module itself.

Figure 1:
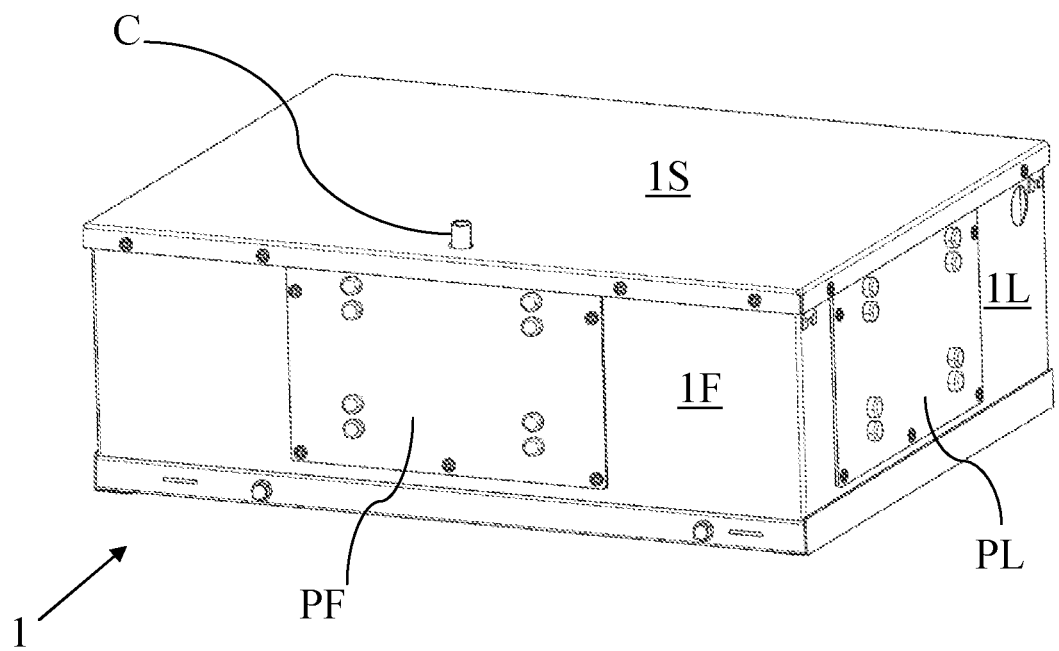
FIG. 1 shows a perspective view of the housing according to the present invention.
Figure 2:
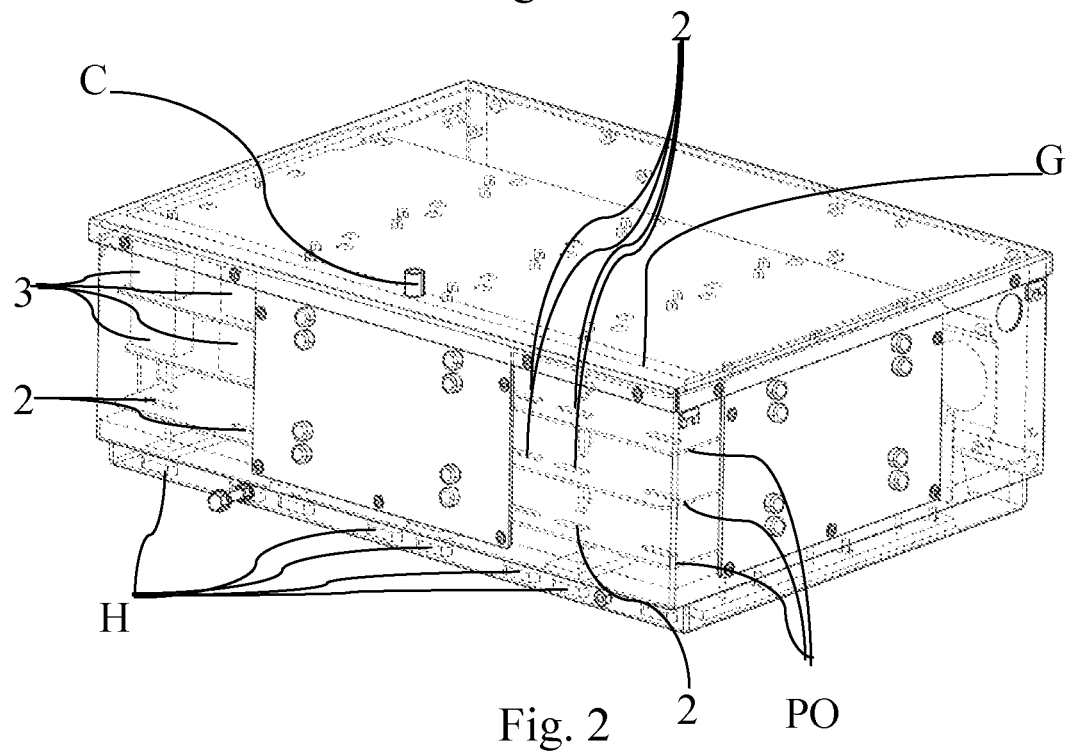
FIG. 2 shows the same view as FIG. 1 with some parts shown in transparency.

Each horizontal plate is provided with appropriate slots 2, that can be seen more clearly in FIG. 2, corresponding to the evacuation openings M1 of the battery-modules M.

Each slot is provided with an appropriate gasket on both faces of the same horizontal plate.

Figure 5:
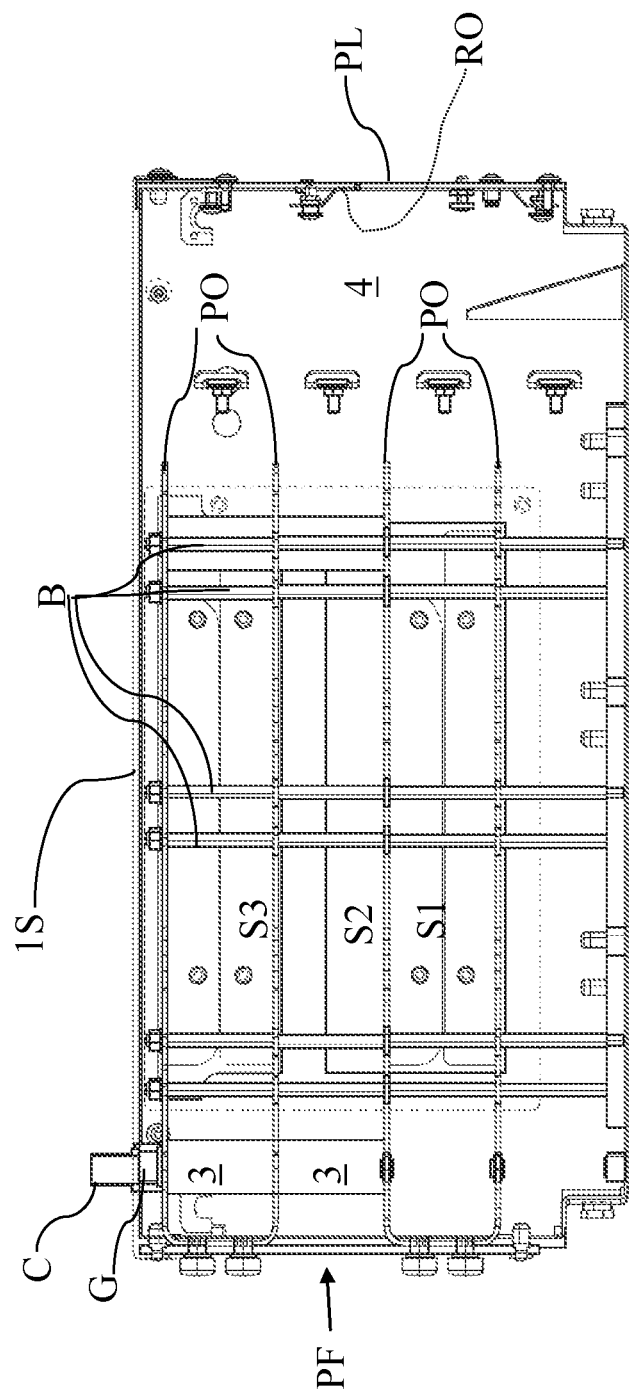
FIG. 5 shows a side view with the parts in transparency of FIG. 1.

The battery-modules are arranged in layers S1, S2, S3, in the housing 1, see FIG. 5. A first lower layer S1, wherein the battery-modules M are one next to the other on a first horizontal plate PO. A second horizontal plate covers the first layer of battery-modules, so that two opposite sides of the same battery-modules are in contact with two horizontal plates parallel to each other, namely to form a sandwich.

Battery-modules M are arranged so that the evacuation openings M1 are reciprocally aligned parallel to one of the sides of the housing 1, preferably to the front plate 1F. In particular, the evacuation openings are arranged vertically, namely with their development axis being vertical.

Over the second horizontal place, further battery-modules M are accommodated to form a second layer S2. Also for this layer, battery-modules are placed one next to the other, so that the evacuation openings M1 are aligned parallel to the aforementioned one of the sides of the housing, corresponding exactly to the evacuation openings of the first layer of battery-modules M. Thus there is a vertical alignment between the different layers of battery-modules.

Thus, (pairs of) vertical evacuation channel are defined, being continuous and gastight towards the inside of the housing, which pass through the different layers of battery-modules M ending up outside the housing.

A horizontal canalization G is arranged over the last horizontal place, in correspondence of such channels, which gathers the different vertical channels. Such canalization contributes to reduce the gas temperature before they leave the housing. A chimney C makes said horizontal canalization G communicate with the outside of the housing 1, through the upper plate 1S. Preferably, such chimney C is arranged in medial position with respect to the distribution of the battery-modules M.

Further openings are made in the lower plate 1I, always in correspondence of the openings M1 in the battery-modules, so as to facilitate the gas circulation from the bottom upwards.

Also the lower plate 1I is equipped with appropriate gaskets H which surround the aforementioned openings so as to contribute to the realization of the gastight vent channels towards the inside of the housing 1.

Advantageously, the channels defined are open only towards the outside of the housing through a check valve, thus, in case of a failure of only one of the battery-modules, hot gases are evacuated without hitting the internal circuitry and internal components or further adjacent battery-modules of the battery-module pack.

Furthermore, a path is forced through the aforementioned canalization G with the aim to cool the hot gases before they go out, for the safety of people that may possible be in close proximity.

It is thus evident that the horizontal plates themselves, from the one hand have a function of conveying the heat given off by the battery-modules. On the other hand, they contribute to define evacuation channels of the hot gases that are given off in case of a damage of a battery.

With reference to FIG. 5, the portion 4 inside the housing is intended to accommodate the electronic circuitry that and interrupters and protections are usually associated to the battery-modules.

Such circuitry, by virtue of the present invention, is protected from being hit by the hot gases in case of a damage of at least one battery.

Such internal area is accessible from outside through the opening RO.

With reference to FIG. 2, in case not all the available allocations for housing the battery-modules are occupied, some evacuation channels would be incomplete, and will communicate with the internal part of the housing. To avoid this, tubular elements 3 are provided, arranged with their development axis perpendicular to the horizontal plates PO, in order to ensure the continuity of the aforementioned channels.

Advantageously, such tubular elements allow the housing to become modular, namely a lower number of battery-modules with respect to its capacity can be installed therein.

It is worth noting that, by virtue of the operativeness of the aforementioned evacuation channels of the hot gases, the vertical or horizontal directions are immediately identified by the person skilled in the art, identifying them also from the orientation of the reference signs with reference to the FIGS. 1-5 themselves.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details. The elements and the characteristics described in the different preferred embodiments may be combined without departing from the scope of the present application. What is described in the description of the prior art, if not explicitly excluded in the detailed description, has to be considered in combination with the characteristics of the present invention, forming an integral part of the present invention.

The invention claimed is:

1. A housing (1) having vehicle battery-modules (M), each vehicle battery-module (M) having a parallelepipedal shape with at least an evacuation through opening (M1) for hot gases, the housing having a parallelepipedal shape having an upper surface (1S), a lower surface (1I) and perimetral surfaces (1F, 1L, 1P) and having a plurality of horizontal plates (PO) arranged inside the housing (1), parallel to each other, alternated in direct physical contact with and between two layers of at least three layers (S1, S2, S3) of the battery-modules (M), wherein each one of said horizontal plates (PO) is joined to said perimetral surfaces (1F, 1L, 1P) to convey the heat towards the external environment, wherein each battery-module (M) is arranged so that said evacuation through openings (M1) of the at least three layers (S1, S2, S3) of the battery-modules (M) are vertically aligned with each other, wherein each one of said horizontal plates (PO) comprises corresponding through openings (2) equipped with appropriate gaskets on both the opposite faces of the horizontal plates (PO) in order to define continuous and gastight vertical evacuation channels defined by cooperation and vertical alignment of the evacuation through openings (M1) of the at least three layers (S1, S2, S3) of the battery-modules (M) and the corresponding through openings (2) of the horizontal plates (PO), and wherein the continuous and gastight vertical evacuation channels are the only evacuation channels present in the housing (1) from the lower surface (1I) through the at least three layers (S1, S2, S3) of battery-modules (M) and intervening horizontal plates (PO).

2. The housing (1) according to claim 1, wherein the evacuation through openings (M1) are parallel to one side of the housing (1).

3. The housing (1) according to claim 1, wherein above said continuous and gastight vertical evacuation channels, a horizontal canalization (G) is arranged and adapted to convey the hot gases from said continuous and gastight vertical evacuation channels, the horizontal canalization (G) having a chimney (C) which makes said horizontal canalization (G) communicate with the external environment, through the upper surface (1S).

4. The housing (1) according to claim 1, wherein said lower surface (1I) comprises further openings, operatively in alignment with and in communication with the evacuation through openings (M1), so as to facilitate gas circulation of the hot gases from a bottom of the housing (1) upwards.

5. The housing (1) according to claim 4, wherein said openings of the lower surface (1I) are surrounded by gaskets (H).

6. The housing (1) according to claim 1, wherein said continuous and gastight vertical evacuation channels between the layers (S1, S2, S3) of battery-modules (M) are open only towards the outside of the housing (1).

7. The housing (1) according to claim 1, wherein, when a respective battery-module (M) is absent, at least one of said continuous and gastight vertical evacuation channels is defined at least partially by a tubular element (3), arranged between respective horizontal plates (PO).

8. An electric or hybrid vehicle, comprising the housing (1) of battery-modules (M) according to claim 1.

* * * * *